Jan. 20, 1959  M. LEVIN  2,869,275
FISHING LINE SIGNAL DEVICE
Filed May 29, 1957  2 Sheets-Sheet 1
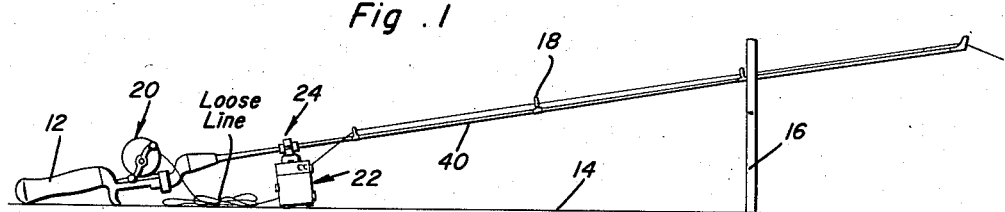
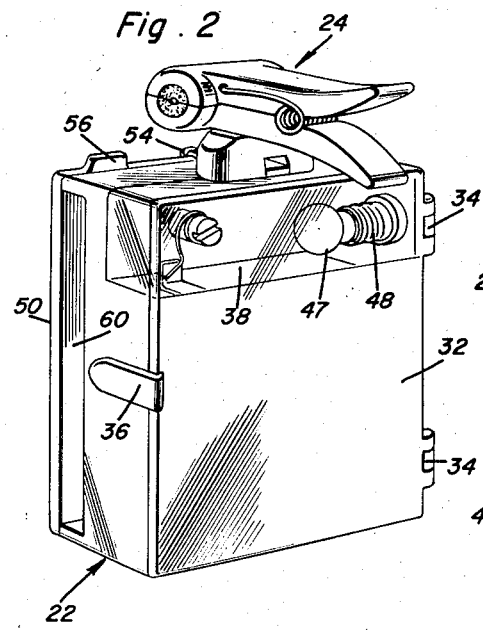
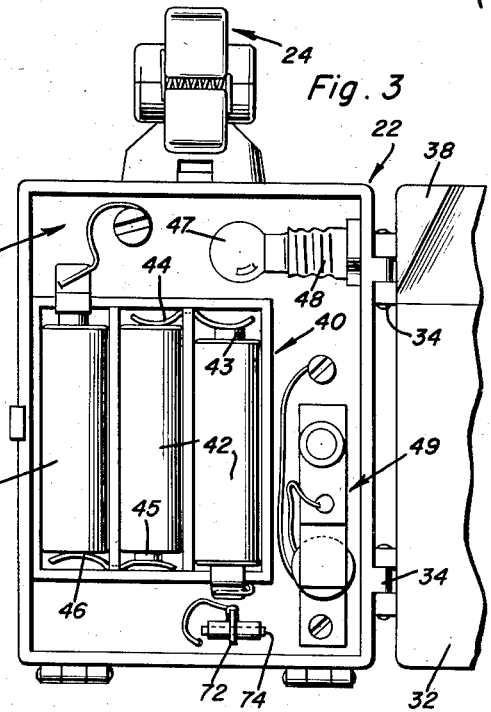
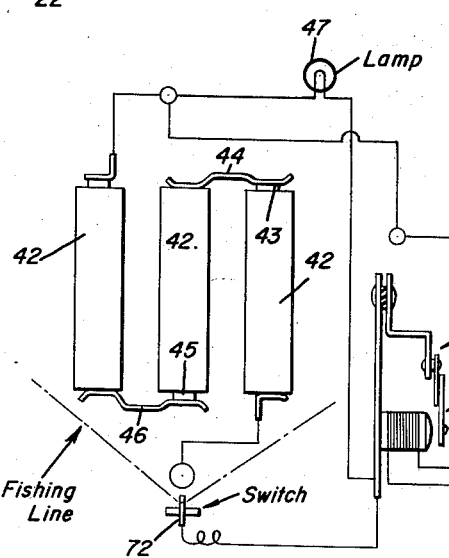
Meyer Levin
INVENTOR.
BY
Attorneys

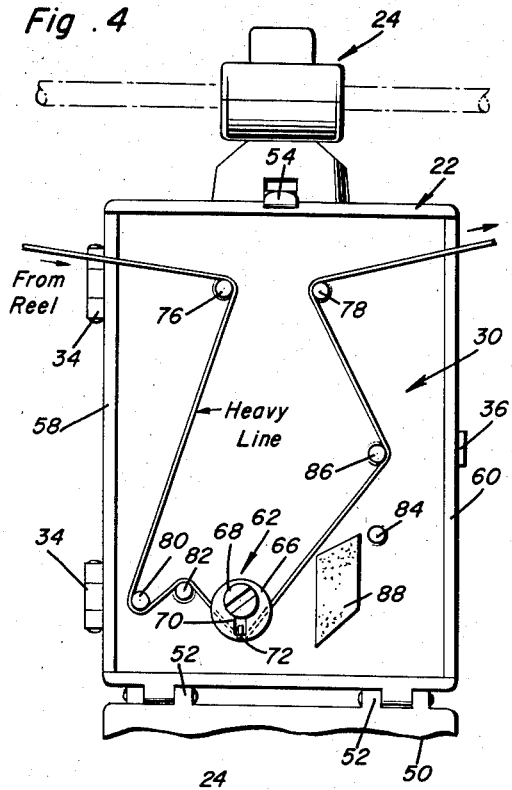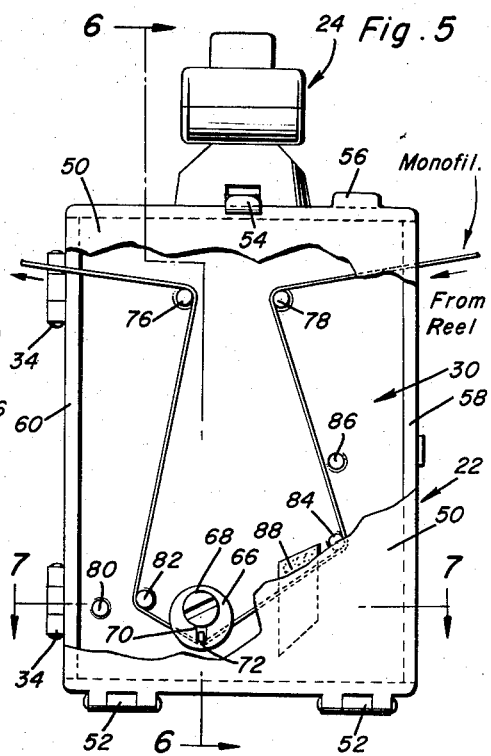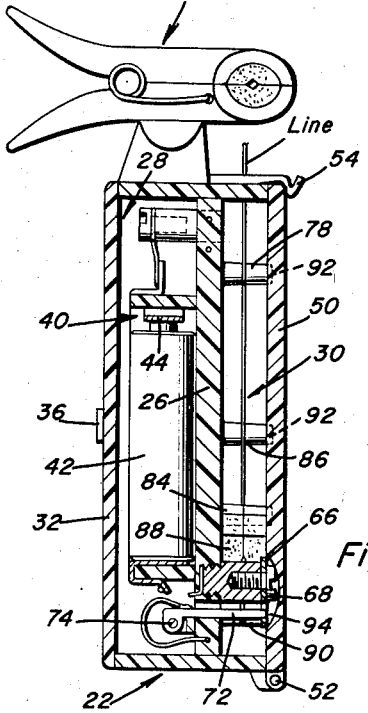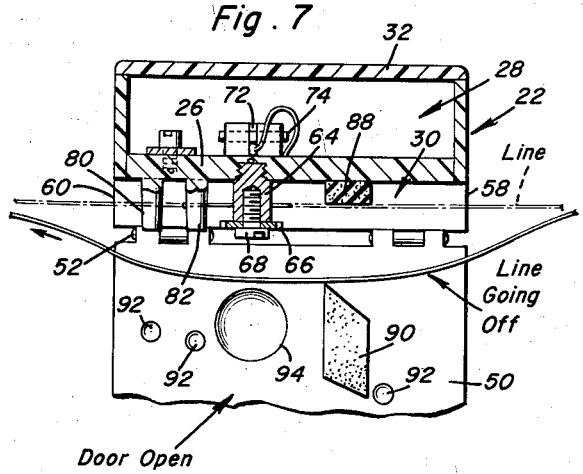

United States Patent Office 2,869,275
Patented Jan. 20, 1959

2,869,275

FISHING LINE SIGNAL DEVICE

Meyer Levin, Johnstown, Pa.

Application May 29, 1957, Serial No. 662,435

8 Claims. (Cl. 43—17)

This invention relates, generally speaking, to fishing tackle but has reference more in particular to a simple, practical and economical self-contained bite signal device; that is, a lightweight pocket-size device which functions to alert and notify a still fisherman that a strike has been made.

More specifically, the device is such in construction that it operates efficiently, easily and surely and embodies selectively usable visual and audible signals, for example, a light bulb or a buzzer. In carrying out the principles of the inventive concept a specially devised device is utilized wherein the signal continues to be given as long as the fish or other aquatic quarry retains the hook and exerts pull-tension on the line. Also, the invention functions equally well with any type of fishing line or reel, that is casting line, fly line or spinning line.

As will be evident, a casting line or fly line does not present a problem when employing the improved device. However, in the situation having to do with a spinning line, when the bail of the reel is left open (as is proper) there is no tension whatever to the line and a hooked fish will take the line off the reel without feeling any resistance. Only when the fisherman closes the bail does the fish encounter such resistance. It is wise therefore, in an effort to preserve fishing technique, to pay particular attention to the consideration of this line resistance. The device does impart resistance to the line but only to an infinitestimal and negligible degree. Fishing habits of the user need not be changed. In brief, the device will not mar or injure the line or rod and offers no obstacle in the pursuit of one's normal fishing habits. Rather the pleasure of fishing is greatly enhanced by the advantages provided by the invention herein under consideration.

Considering the concept from the point of view that it comprehends fishing tackle, this involves the appreciation and use of any suitable fishing rod which, as is usual, is equipped with customary longitudinally spaced guide eyes or the like and a reel, of whatever type is desired by the user, said reel being provided with any suitable weight of fishing line. The novel unattended bite signal or alarm device is carried by the rod and a portion of the line between the reel and the device is by-passed or directed in a unique manner, to be set forth, and is allowed to slide through a confining passageway which is provided therefor in the device. The leading end portion of the line passes outwardly through and beyond the forward or discharge end of the passageway and is then threaded through the line guide eyes which are located beyond said discharge end. At least one electrically operated signal is operatively mounted on or in the device and is controlled by a line-tripped normally open switch, that is, a simple switch which embodies cooperable fixed and movable contact elements. These elements are confined for operation in the restricted passageway. A nominal part of the portion of the line which is operable in the passageway is situated beneath and preferably touches and is releasably cooperable with the movable contact element. Selectively usable line guides are fixedly mounted in predetermined relationship in the passageway and these are adjacent to but are in plane above the plane of the switch. The stated portion of the line is slidably trained over these line guides in a special manner to condition and maintain the stated portion of the line in a readily responsive state offering minimum resistance to the forward travel of the line. Consequently, when a strike is had and the baited end of the line is pulled, the added tension thus exerted on the over-all line tautens and lifts that part of the line which is situated beneath the movable contact element, closing the circuit and brings the desired signal quickly into play.

Although the device is susceptible of being satisfactorily incorporated in and to form a part of a fishing rod, it is preferably in the nature of an attachment. That is to say, it comprises a simple box-like case or enclosure centrally partitioned by an internal panel to define compartments on each side of the panel. One compartment serves as a housing or container for dry cell batteries, the warning signals and has an openable and closeable door. The other or second compartment also has a suitably mounted outwardly and downwardly swingable door and readily accessible manually controllable retaining means. The contact elements of the aforementioned switch are disposed in the last named compartment for use in conjunction with a plurality of spaced line suspending and guide pins. The pins project from the panel in predetermined positions above the plane of the switch. The leading and trailing vertical portions of the second compartment are open to allow the line to pass slidingly through said compartment and to be trained in a predetermined manner for cooperation with the pins and switch. A simple friction brake is also arranged in the compartment for use in a manner to be hereinafter described.

Other objects, features and advantages of the invention will become more readily apparent from the following description and the accompanying drawings.

In the drawings, wherein like numerals are employed to designate like parts throughout the views:

Fig. 1 is a side elevation on a small scale showing the fishing rod, reel and line set up for use with the improved pull-actuated bite signal device removably hung on the rod for use;

Fig. 2 is a perspective view of the device by itself observing the signal compartment side thereof;

Fig. 3 is an elevational view of the same side with the door open and partially broken away;

Fig. 4 is an elevational view of the opposite side of the device showing the line rigged or set for operation, this being a so-called heavy line;

Fig. 5 is a similar view with the door closed and broken away to expose and show how a lightweight monofil line is set to bring the friction brake into play, this view illustrating the line traveling from right to left;

Fig. 6 is a view in section and elevation taken on the irregular vertical line 6—6 of Fig. 5, looking in the direction of the arrows;

Fig. 7 is a horizontal section on the line 7—7 with the door swung open; and

Fig. 8 is a view of the wiring diagram.

With reference first to Fig. 1 the conventional fishing rod 40 is shown with the handle or grip 12 resting on the surface 14 and with the outer end of the rod supported in an inclined position at 16. The guide eyes are denoted at 18 and the reel at 20. The novel readily attachable and removable alarm or signal device is denoted generally at 22. As to the latter any place on the rod will serve, but for the sake of convenience to the user, a position closer to the reel would serve the user more efficiently. In the case of a casting rod, about ten or fifteen yards of line should be stripped from the reel and allowed to remain coiled on the ground. This is normal procedure whether or not my device is used. Such stripping removes the factor of reel tension and allows a game fish to "run" with the bait. Reel tension is no factor in the case of spinning, because as explained the bail is left open in proper procedure.

I should like to make the comment at this point that heavy lines refer to those over 6 pound test. Light lines refer to those of 6 pound test and less including all the various monofilaments and braided types. Line diameters seem to be the factor that determines the course selected by the user. My tests indicate that the line of demarcation rests at the point of six pounds.

As before mentioned, the device in its preferred embodiment is characterized by a hollow box-like case atop which any suitable clamp or attaching means 24 is provided. The construction of this should be such that the device may be readily applied and removed. A flat faced panel 26 on the interior of the body of the case is arranged and serves to divide the box into a first compartment 28 and a second compartment 30. An appropriate door 32 is hingedly mounted at 34 and has an appropriate clasp or fastener 36 which keeps the door normally closed. The upper portion of the door and box may be transparent as at 38 (Fig. 2). As seen in Fig. 3 the panel carries a container 40 for the insertable and removable flashlight batteries 42. These batteries are electrically connected at points 43, 44, 45 and 46 (also brought out in the diagram in Fig. 8). The batteries are also electrically connected with the light bulb 47 mounted in the socket 48 and with the audible signal or buzzer 49. It is to be pointed out here that any suitable arrangement of signals, wiring and batteries may, of course, be employed, this being a secondary aspect of the over-all invention.

Referring now to the shallow line by-passing compartment 30 it will be seen that the outwardly and downwardly swingable door is denoted at 50 and this is hingedly mounted at 52. It is kept closed by an accessible finger trippable catch or the like 54. Also as seen in Fig. 5 there is a lug 56 projecting from the top edge of the door close to the catch so that these components may be easily operated for purposes to be set forth. The line enters the inlet slot 58 and passes out by way of the discharge slot 60. The switch in this compartment is denoted generally by the numeral 62 and comprises an aluminum stud 64 screwed into the panel and carrying a disk 66 of insulation material which is held in place by the headed fastener 68. This is the stationary contact element as is obvious. The disk is eccentrically mounted and in the lower portion there is a vertical slot 70 to accommodate the liftable and lowerable end portion of the movable contact element 72, this being hingedly mounted at 74 in the compartment 28 as best shown in Fig. 6. The movable element is a lightweight and highly sensitive part and is therefore easily trippable. The switch parts are wired with the cooperating components in the manner shown and particularly brought out in the wiring diagram in Fig. 8. No detailed description of the circuits is believed to be required.

Referring now to Figs. 4 and 5, the plurality of guide pins as shown and the two uppermost pins are denoted by the numerals 76 and 78. The two pins to the lower left are denoted at 80 and 82 and these pins as well as the remaining pins 84 and 86 are all above the plane of the switch 62. The "friction brake" comprises a block of rubber or the like 88 mounted on the panel to the right (Fig. 4) of the switch and this cooperates with a companion block 90 mounted on the interior surface of the closing door 50. It will be seen that the door has depressions 92 therein to seat and accommodate the outer ends of the pins in the manner shown for example in Fig. 6. The larger depression 94 is to accommodate the disk 66 and screw 68. All of the guide pins are smooth surfaced and are of relatively small cross-section and are tapered outwardly and are seated in their respective depressions 92 when the door 50 is closed whereby to permit the line to be strung over the pins either in the heavy line position shown in Fig. 4 or the light line position or "set" shown in Fig. 5. With respect to the showing seen in Fig. 5 wherein the lightweight monofil line is shown strung, it will be evident that a portion of the line is friction gripped between the blocks 88 and 90.

As is evident in Fig. 4 the portion of the line which operates through the compartment or passageway 30 is trained over or about the pins 76, 80, 82, 86 and 78 respectively. The low or central portion of this then sling-like arrangement of the line is V-shaped as shown in dotted lines and is in contact and readiness for operation beneath the movable contact bar or element 72. With respect to Fig. 4 it is to be assumed that this is the position of the device on the rod as seen in Fig. 1 with the handle at the left. With the light line shown in Fig. 5 the direction of motion of the line is from right to left and therefore the handle 12 would be at the right. In Fig. 5 it will be seen that the line is trained over or around pins 76, 82, 84 and 78. The median portion which underlies the movable contact, that is the portion between the contact and the pin 84, also operates between the friction blocks 88 and 90.

The fishing line arranged, according to very simple instructions, in the line coursing box closes the movable contact element or bar when a fish or other aquatic life attacks the bait and tugs at the line. The closed contact bar completes the simple electric circuit and activates the alarm. After the alarm has been given, the fisherman has only to open the line box, automatically releasing the fishing line, take the device off the rod, place it in his pocket and proceed to play his catch. The entire procedure takes place in the matter of a few seconds.

It will be evident that the friction brake means 88 and 90 is used for spinning lines (when the bail of the spinning reel is left open), and the alternate route in Fig. 4 for casting and fly lines (which do not require the use of the friction brake). This alternate route is also used for spinning lines when the bail of the spinning reel is closed. The friction brake need not be used in this case because, as in fly reels and casting reels, there is more than enough resistance present to allow the line to close the switch. It will also be evident that any tension exerted on the fishing line by something attacking the bait would tend to straighten out the lower or bight portion of the aforementioned sling-like formation of the line in a plane above the switch. This straightening action of the line obviously exerts a lifting force on the movable contact element and closes the circuit. Release of the tension will allow the stated portion of the line to drop away from the contact element.

It will be further noted that the free ends of the guide pins being seated in the depressions 92 in the door 50 serve to prevent the fishing line from slipping off guide pins, from fouling and subsequently rendering the device inoperative.

It is within the perview of the invention to place the two points of tension (shown in Figs. 4 and 5 on opposite sides of the switch) differently. That is to say, it is practical to place both of these points on the same side of the switch. This will enable the user to position the device on the rod one way to accommodate all types of lines. Then, too, a feature to be kept in mind is the negligible amount of tension applied to the fishing line in the operation of the device. It is important to keep this tension down to the barest minimum for reasons obvious to any experienced fisherman. Of equal significance is the fact that the moment the door 50 is swung open, the line previously confined in the compartment 30 virtually "drops" off and is fully released so as not to interfere with the fisherman's needs.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pocket-size alarm device for readily removable attachment to a fishing rod comprising a hollow case having quick-releasable means whereby said case may be detachably mounted on a fishing-rod, said case being equipped with a bite signal, either visual or audible, batteries and a switch operatively connected to one another, said switch having cooperating stationary and movable contact elements, said case also having a passageway for a limited portion of a fishing line, said contact elements being located in a lower portion of said passageway, a part of said portion of said line being situated beneath, touching and being releasably cooperable with said movable contact element, fixed line guide means confined in said passageway adjacent to but in a plane above the plane of said switch and over which said portion of the line is slidably trained to condition and maintain said portion of the line in a readily responsive state of minimal and easily trippable tension, whereby when a strike is had and the baited end of the line is pulled, the added tension thus exerted on the overall line tautens and lifts that part of the line which is situated beneath the movable contact element, closes the circuit and brings said signal quickly into play.

2. A pocket-size alarm device for readily removable attachment to a fishing rod and which is equally efficient when functioning with any and all kinds of fishing lines, comprising a lightweight hollow box-like case having an internal panel defining first and second compartments, the first compartment having a door, warning signals mounted in said first compartment, dry cell batteries mounted in said compartment, a switch having stationary and movable contact elements confined for operation in the second compartment, said warning signals, batteries and switch elements being electrically connected with one another, said second compartment having vertical marginal portions and being relatively shallow and having a hingedly mounted outwardly and downwardly swinging door provided with easily accessible and operable retaining means for said door, and a plurality of spaced line suspending and guide pins fixed to and projecting from said panel into said second compartment, said pins being situated in a plane above said movable contact element, said vertical marginal portions of said second compartment being unobstructedly open to allow the line to pass slidingly through said second compartment and to be trained in a predetermined manner about said guide pins and beneath said movable contact element.

3. A pocket-size bite signal adapted to be attached removably to a fishing rod comprising a case having a passageway for a portion of a fishing line, at least one electrically operated signal operatively mounted in a space provided therefor in said case, a normally open switch embodying fixed and movable contact elements operable in said passageway, a part of said portion of said line being situated beneath, touching and being releasably cooperable with said movable contact element, fixed line guides confined in said passageway adjacent to but in a plane above the plane of said switch and over which said portion of the line is slidably trained, said line passageway being characterized by a pair of opposed, closely spaced walls, one wall being fixed, said line guides being mounted thereon and projecting laterally therefrom with the outer ends of the line guides unobstructedly free, the other wall being hingedly mounted and constituting an outwardly opening door and the inner surface of said door when closed abutting the outer ends of said line guides, that portion of the line cooperating with the movable contact element of said switch and said line guides being freed for liberation from the line guides and contact element the moment said door is swung to an open line freeing and releasing position, and friction brake means comprising a first line gripping element mounted on said fixed wall, and a second line gripping element mounted on the interior of said door and movable toward and from said first element, whereby, when a portion of the fishing line is sandwiched between said elements by closing action of said door, the elements then function to provide a friction brake for the cooperating portion of the line.

4. A pocket-size alarm device adapted to be detachably mounted on a fishing rod comprising a case having a passageway for a portion of a fishing line, said case being equipped with alarm means, either visual or audible, dry cell batteries, and a switch operatively connected to one another, said switch having cooperating stationary and movable contact elements, said movable contact element being located in a lower portion of said passageway, a part of said portion of said line being situated beneath, touching and being releasably cooperable with said movable contact element, cooperating line tensioning means in said passageway adjacent to but in a plane above the plane of said switch and over which a portion of said line is passed and subjected to minimal tension so that when a strike is had and the baited end of the line is pulled, the friction braking action thus encountered results in lifting that part of the line which is situated beneath the movable contact element, closes the circuit and brings the signal quickly into play.

5. For use on a fishing rod having a reel operatively mounted thereon and a fishing line carried by said reel; an unattended bite signal device adapted to be removably hinged on said rod, a portion of said line between the reel and device being adapted to be directed slidably through a line confining passageway provided therefor in said device, said line being adapted to pass outwardly through and beyond a discharge end of said passageway, at least one electrically operated signal operatively mounted on said device and controlled by a line-tripped normally open switch embodying fixed and movable contact elements operable in said passageway, a minimal portion of said portion of said line being situated beneath, touching and being releasably cooperable with said movable contact element, fixed selectively usable line guides confined in said passageway adjacent to but all in a plane above the plane of said switch and over which said portion of the line is slidably trained to condition and maintain said portion of the line in readily responsive state of minimal and easily trippable tension, whereby when the strike is had and the baited end of the line is pulled, the added tension thus exerted on the over-all line tautens and lifts the minimal portion of the line situated beneath the movable contact element, closes the circuit, and brings said signal into play, the line passageway in said device being characterized by a pair of opposed closely spaced walls, one wall being fixed, said line guides being mounted thereon and projecting laterally therefrom with the outer ends of the line guides unobstructedly free, the other wall being hingedly mounted and constituting an outwardly opening door and the inner surface of said door, when closed, abutting the outer ends of said line guides, that portion of the line cooperating with the movable contact element of said switch and said line guides being freed for liberation from the line guides and contact element the moment said door is swung to an open line freeing and releasing position.

6. The structure defined in claim 5, and wherein said device embodies readily available hanger means whereby the device may be suspended on a predetermined portion of the rod, and said door being provided with manually releasable catch means for uncovering and rendering the entire space of said passageway freely accessible to permit one to manually and initially string the line about the line guides in a manner to provide a sensitive ready-to-operate and subsequently releasable setting of that portion of the line which is confined for functioning in said passageway; said line guides comprising smooth-surfaced pins staggered and positioned relative to each other so that said portion of the line which cooperates therewith follows an irregular path of movement sufficient to impose the desired minimal resistance needed to prepare said portion of the line for sensitive responsiveness and quick switch-closing action.

7. A bite signal device adapted to be detachably mounted on a fishing rod, said device being equipped with bite signalling means, either visual or audible, batteries, and a switch operatively connected to one another, said switch having cooperating stationary and movable contact elements, said device having a passageway for a limited portion of the fishing line, said contact element being located in the lower portion of said passageway; a part of said portion of said line being situated beneath, touching and being releasably cooperable with said movable contact element, fixed selectively usable line guides confined in said passageway adjacent to but in a plane above the plane of said switch and over which said portion of the line is slidably trained to condition and maintain said portion of the line in a readily responsive state of minimal and easily trippable tension, whereby when a strike is had and the baited end of the line is pulled, the added tension thus exerted on the overall line tautens and lifts that part of the line which is situated beneath the movable contact element, closes the circuit and brings said signal quickly into play, said portion of the line being temporarily suspended in a set-to-operate manner on said line guides and confined against displacement by a covering wall constituting a readily openable door and being freed and liberated from said line guides and movable contact element when said door is swung open, said line guides comprising a plurality of spaced smooth-surfaced pins arranged in a manner to permit said portion of the line to be strung slidingly thereover to the initial tautness needed depending on the weight of the line being used, the outer ends of said pins being tapered and free and the inner side of said door abutting said outer ends to thus retain the line positioned on the pins but in readiness to slide outwardly and off the pins the moment the door is opened and the retaining function of said door is removed.

8. A pocket-size alarm device for readily removable attachment to a fishing rod comprising a hollow case having quick-releasable means whereby said case may be detachably mounted on a fishing rod, said case being equipped with a bite signal, either visual or audible, batteries and a switch operatively connected to one another, said switch having cooperating stationary and movable contact elements, said case also having a passageway for a limited portion of a fishing line, said contact element being located in a lower portion of said passageway, a part of said portion of said line being situated beneath, touching and being releasably cooperable with said movable contact element, means in said passageway adjacent to but in a plane above the plane of said switch and over which said portion of the line is slidably trained to condition and maintain said portion of the line in a readily responsive state of minimal and easily trippable tension, whereby when a strike is had and the baited end of the line is pulled, the added tension thus exerted on the over-all line tautens and lifts that part of the line which is situated beneath the movable contact element, closes the circuit and brings said signal quickly into play, said means embodying cooperable opposed compressibly resilient elements between which a cooperating portion of the line is sandwiched and subjected to a friction braking action.

References Cited in the file of this patent

UNITED STATES PATENTS

| | | |
|---|---|---|
| 2,554,197 | Kronquest | May 22, 1951 |
| 2,556,628 | Nisle | June 12, 1951 |
| 2,560,905 | Teel | July 17, 1951 |
| 2,785,491 | Gibson | Mar. 19, 1957 |